No. 872,796. PATENTED DEC. 3, 1907.
F. S. CARR.
STUD MEMBER OF STUD AND SOCKET FASTENING DEVICES.
APPLICATION FILED NOV. 3, 1906.

Witnesses.

Inventor.
F. S. Carr

UNITED STATES PATENT OFFICE.

FRED S. CARR, OF MALDEN, MASSACHUSETTS.

STUD MEMBER OF STUD-AND-SOCKET FASTENING DEVICES.

No. 872,796.     Specification of Letters Patent.     Patented Dec. 3, 1907.

Application filed November 3, 1906. Serial No. 341,841.

*To all whom it may concern:*

Be it known that I, FRED S. CARR, of Malden, in the county of Middlesex and State of Massachusetts, have invented certain new and useful Improvements in the Stud Members of Stud-and-Socket Fastening Devices, of which the following is a specification.

This invention relates to fastening devices comprising a socket member having grasping jaws of a yielding character, and a stud member adapted to be inserted in the socket member and engaged with the jaws, the said members being provided with means for attachment to the two parts to be separably connected by the fastener.

The invention relates particularly to the stud member of a fastening device of this character, and has for its object, first, to enable the stud member to be so firmly engaged with the jaws that any attempt to disengage it from the jaws by a direct or outward pull substantially lengthwise of the stud member will increase the firmness of engagement, and prevent disengagement or separation of the two members.

The invention also has for its object to provide certain improvements in the construction of the stud member whereby the expense of construction is reduced to the minimum.

The invention consists in the improvements which I will now proceed to describe and claim.

Figure 1:
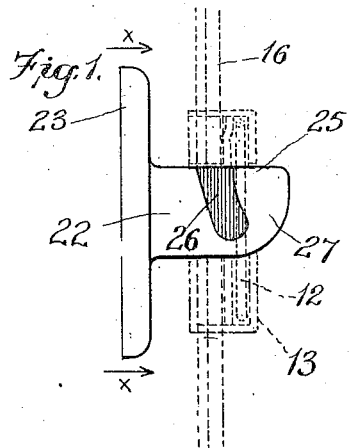
Figure 2:
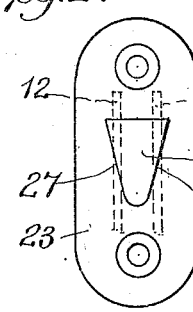
Figure 3:
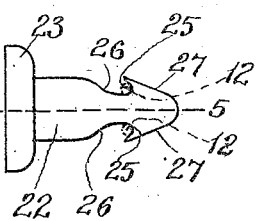
Figure 4:
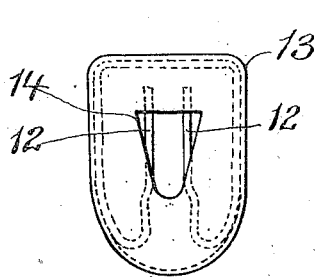
Figure 5:
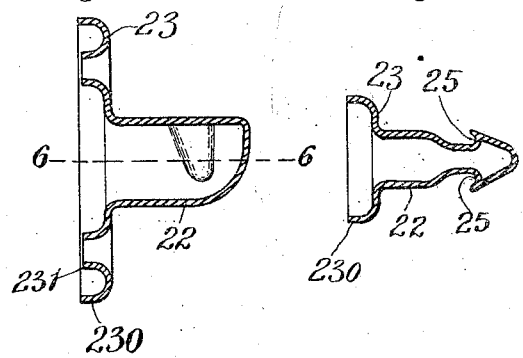
Figure 6:
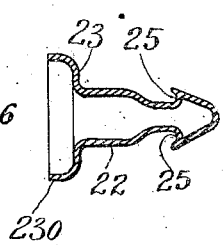
Figure 7:
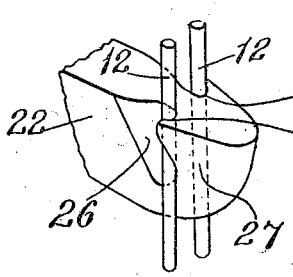
Figure 8:
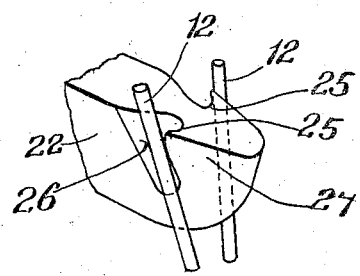

Of the accompanying drawings, forming a part of this specification,—Figure 1 represents a side elevation of a stud member embodying my invention, the socket member being shown in dotted lines. Fig. 2 represents an end elevation of the stud member, showing in dotted lines the yielding jaws of the socket member. Fig. 3 represents a top plan view of the stud member, the jaws being shown in dotted lines. Fig. 4 represents a front view of the socket member which is employed with the stud member. Fig. 5 represents a section on line 5—5 of Fig. 3. Fig. 6 represents a section on line 6—6 of Fig. 5. Fig. 7 represents a perspective view of the stud member, its base being broken away, showing the jaws in engagement with the shoulders of the stud member. Fig. 8 represents a view showing the jaws tipped to cause their disengagement from the shoulders of the stud member.

The same letters of reference indicate the same parts in all the figures.

In the drawings, 12 12 represent the jaws of the socket member with which my improved stud member, forming the subject of this invention, is used, the said jaws being preferably the end portions of a wire member which is bent substantially as indicated in Fig. 4, to form the said jaws, and a marginal portion connecting the jaws, each jaw being free at one end. The jaws are contained in a casing 13 having an orifice 14 for the stud member, and suitable means for engagement with one of the two parts which are to be connected by the fastening device, the said parts being, for example, the portions of a glove which form the edges of the wrist opening, or one of said portions may be the curtain of a carriage top and the other the frame work of said top. In fact, the fastening device to which my invention relates is capable of a variety of applications, and is not limited in this respect.

In Fig. 1 the part to which the socket member is attached is indicated by dotted lines, and is designated by the reference numeral 16. I will hereinafter refer to the part 16 as the holder for the socket member, it being understood that this holder may be a part of a glove, carriage curtain or any other device.

The jaws 12 are free to move toward and from each other, and they extend across the opening 14, as shown in Fig. 4. They are normally held relatively close to each other by the resilience of the wire, and are adapted to be sprung outwardly or pressed apart by the insertion of the stud member between them.

22 represents the stud member, which as here shown is provided with a base 23 adapted to be attached in any suitable way to an inner part, such as the part of a glove which is overlapped by the socket holding part 16, or the frame of a carriage top or any other article. The form of the outer portion of the stud member is such that it is adapted to be inserted between the jaws 12 12, and to displace said jaws outwardly by passing between them, the sides 27 of the stud member at the outer portion thereof being therefore formed to give the stud member a wedge-shaped outer end.

The sides of the jaws are provided with shoulders 25, which are formed to engage the jaws 12, and prevent the separation of the socket member from the stud member by a pull or by pressure on the socket member in the outward direction indicated by the arrows x x in Fig. 1, this being the direction in which pressure from within would be exerted on the part or holder 16. The jaw-engaging shoulders 25 are the outer sides of diagonal or undercut grooves formed in the sides of the stud member for the reception of the jaws, the inner sides 26 of said grooves being diagonally disposed so that they are adapted to serve as jaw-displacing faces when the socket member is tipped, so that its upper end is swung inwardly toward the base 23, and its lower end is swung outwardly.

The jaw-engaging shoulders 25 are diagonally formed or undercut, so that their outer edges overhang their inner edges, the shoulders 25 being inclined in opposite directions, instead of being in alinement with each other. This formation of the shoulders increases the strength of their engagement with the jaws, and enables them to engage the jaws more firmly than would be the case if the shoulders 25 were in alinement with each other. Owing to this diagonal formation of the shoulders 25, any attempt to remove the socket member from the stud member in the direction indicated by the arrows x x, will press the jaws inwardly toward each other, so that the firmness of their engagement with the stud member is increased by a direct outward pull or pressure on the socket member.

The sides 27 27 of the outer portion of the stud member are oppositely inclined crosswise of the stud, the said sides being so shaped that the outer portion of the stud member is wedge shaped in cross section, as shown in Fig. 2. The sides 27 constitute jaw-displacing faces which are adapted to act either alone or in connection with the faces 26 in forcing the jaws outwardly away from each other when the socket member is tipped or inclined. The jaws 12 may be readily disengaged from the stud member by giving the jaws and the socket member a tipping movement by swinging outwardly the lower end of the socket member and at the same time swinging inwardly its upper end. When this is done the jaw-displacing faces 26 27 act to separate or force outwardly the jaws until they are disengaged from the shoulders 25, and are therefore free to slip off from the outer portion of the stud member. This movement of the socket member may be conveniently effected by grasping the lower edge of the part or holder 16, and tipping it outwardly and upwardly.

The stud member 22 is preferably formed from sheet metal, the stud being hollow, as shown in Figs. 5 and 6, and composed of side portions in which the undercut grooves are formed by forcing portions of the sheet metal sides inwardly, and side-connecting portions integral with the side portions, and constituting the top and bottom edges of the stud. This construction decreases the weight of the stud and the cost of making it, as compared with a stud which is made of solid metal. The base 23 of the stud member is also preferably made of sheet metal, and integral with the sides and side-connecting portions of the stud, the marginal portion of the base being provided with a stiffening flange 230 which is bent from the base, and bears on the part to which the stud is attached. The orifices in the base for the reception of the attaching members may be surrounded by inwardly projecting flanges 231.

It is obvious that the members of my improved fastening device may be of any desired size, and thus adapted for the work required, a glove fastener, of course, being much smaller than a fastener for carriage curtains.

I claim:

1. In a stud and socket fastening device, a stud member having inclined sides or faces at its outer portion, and diagonal or undercut grooves in its sides for the reception of socket jaws, the grooves extending inward from said inclined faces, and being arranged so that a direct outward pull on jaws in said grooves will force the jaws toward each other, and thus increase the firmness of their engagement with the stud member.

2. A fastening device comprising a socket member having separable resilient jaws normally held yieldingly in their operative position, and a stud member having inclined sides or faces at its outer portion, and having diagonal or undercut grooves for the reception of said jaws extending inward from said inclined faces, and arranged so that a direct outward pull on the jaws will press them inwardly toward each other, and thus increase the firmness of their engagement with the stud member.

In testimony whereof I have affixed my signature, in presence of two witnesses.

FRED S. CARR.

Witnesses:
C. F. BROWN,
E. BATCHELDER.